(12) United States Patent
Hu

(10) Patent No.: US 12,234,920 B2
(45) Date of Patent: Feb. 25, 2025

(54) CONTROL VALVE

(71) Applicant: HANGZHOU AO KE MEI RUI TECHNOLOGY CO., LTD., Zhejiang (CN)

(72) Inventor: Meiyan Hu, Zhejiang (CN)

(73) Assignee: HANGZHOU AO KE MEI RUI TECHNOLOGY CO., LTD., Zhejiang (CN)

( * ) Notice: Subject to any disclaimer, the term of this patent is extended or adjusted under 35 U.S.C. 154(b) by 179 days.

(21) Appl. No.: 18/027,092

(22) PCT Filed: Sep. 26, 2021

(86) PCT No.: PCT/CN2021/120574
§ 371 (c)(1),
(2) Date: Mar. 17, 2023

(87) PCT Pub. No.: WO2022/151758
PCT Pub. Date: Jul. 21, 2022

(65) Prior Publication Data
US 2023/0332697 A1 Oct. 19, 2023

(30) Foreign Application Priority Data
Jan. 18, 2021 (CN) .......................... 202110065261.1

(51) Int. Cl.
*F16K 11/08* (2006.01)
*F16K 3/24* (2006.01)
(Continued)

(52) U.S. Cl.
CPC .......... *F16K 11/0856* (2013.01); *F16K 3/243* (2013.01); *F16K 5/0407* (2013.01);
(Continued)

(58) Field of Classification Search
CPC .... F16K 11/0856; F16K 3/243; F16K 5/0407; F16K 5/0471; F16K 11/076;
(Continued)

(56) References Cited

U.S. PATENT DOCUMENTS

| 3,658,093 A | 4/1972 | Kirkwood |
| 2015/0369391 A1* | 12/2015 | Fang .................... F16K 5/06 251/279 |

(Continued)

FOREIGN PATENT DOCUMENTS

| CN | 103742675 A | 4/2014 |
| CN | 104806779 A | 7/2015 |

(Continued)

OTHER PUBLICATIONS

The Japanese 1st Office Action issued on Feb. 27, 2024 for JP2023-543128.

(Continued)

*Primary Examiner* — Kevin R Barss
(74) *Attorney, Agent, or Firm* — Yue (Robert) Xu; Apex Attorneys at Law, LLP

(57) ABSTRACT

A control valve, comprising a valve body, a valve element assembly, and a sealing member, wherein the valve body is provided with a mounting cavity, and at least part of the valve element assembly is located in the mounting cavity; the valve body comprises a bottom wall, a side wall and a limiting rib, the side wall is arranged to protrude from the bottom wall, the limiting rib comprises an arc-shaped section, is located in a space enclosed by the side wall and the bottom wall, and protrudes out of the bottom wall, and a gap is provided between the side wall and the limiting rib; the (Continued)

sealing member comprises a first part and a second part, the axial end close to the sealing member being defined as the first part.

20 Claims, 5 Drawing Sheets

(51) Int. Cl.
*F16K 5/04* (2006.01)
*F16K 11/076* (2006.01)
*F16K 11/085* (2006.01)
*F16K 27/04* (2006.01)
*F16K 27/06* (2006.01)

(52) U.S. Cl.
CPC .......... *F16K 5/0471* (2013.01); *F16K 11/076* (2013.01); *F16K 11/085* (2013.01); *F16K 11/0853* (2013.01); *F16K 27/041* (2013.01); *F16K 27/065* (2013.01)

(58) Field of Classification Search
CPC .... F16K 11/085; F16K 11/0853; F16K 27/41; F16K 27/065
See application file for complete search history.

(56) References Cited

U.S. PATENT DOCUMENTS

| | | |
|---|---|---|
| 2018/0292016 A1 | 10/2018 | Ledvora et al. |
| 2019/0003160 A1 | 1/2019 | Zhu |

FOREIGN PATENT DOCUMENTS

| | | |
|---|---|---|
| CN | 206175729 U | 5/2017 |
| CN | 107830207 A | 3/2018 |
| CN | 111828687 A | 10/2020 |
| CN | 111981164 A | 11/2020 |
| EP | 3385583 A1 | 10/2018 |
| JP | H11325278 A | 11/1999 |
| WO | 2018061892 A1 | 4/2018 |

OTHER PUBLICATIONS

International Search Report for PCT/CN2021/120574 mailed Nov. 30, 2021, ISA/CN.
The European search report issued on Dec. 12, 2024 for EP21918949.5.

* cited by examiner

CONTROL VALVE

This disclosure is a national phase application of PCT international patent application PCT/CN2021/120574, filed on Sep. 26, 2021 which claims the priority to Chinese Patent Application No. 202110065261.1, titled "VALVE DEVICE", filed with the China National Intellectual Property Administration on Jan. 18, 2021, the entire disclosure of which isare incorporated herein by reference.

FIELD

The present disclosure relates to the technical field of fluid control, and in particular to a control valve.

BACKGROUND

Some systems need to use a multi-passage control valve to control a flow path. For example, a motor vehicle may generally have multiple control valves in order to conduct controlling at present. In a multi-passage control valve, a sealing member is generally provided between a valve body and a valve core assembly for sealing. During the assembly of the sealing member and valve body, it may cause local deformation of the sealing member during the assembly, thus affecting the sealing effect.

SUMMARY

An object according to the present disclosure is to provide a control valve that can limit a position of a sealing member, prevent the sealing member from generating local deformation during assembly, and improve the sealing effect of the sealing member.

A control valve is provided according to an embodiment of the present disclosure, which includes a valve body, a valve core assembly and a sealing member, the valve body has a mounting cavity, at least part of the valve core assembly is located in the mounting cavity, where the valve body includes a bottom wall, a side wall and a position-limiting rib, the side wall protrudes from the bottom wall, the position-limiting rib includes an arc section, the position-limiting rib is located in a space defined by the side wall and the bottom wall and protrudes from the bottom wall, a gap is formed between the side wall and the position-limiting rib, the sealing member includes a first portion and a second portion, the first portion is close to an axial end of the sealing member, the second portion is located between the valve core assembly and the side wall, the first portion is fixedly connected to the second portion, and the first portion is located in the gap.

In the control valve according to the embodiments of the present disclosure, the control valve includes the valve body, the valve core assembly and the sealing member, and the sealing member is located between the valve core assembly and the side wall of the valve body, which can realize the sealing performance of the sealing member. Since the sealing member and the valve body are two separate members, in order to limit an assembly position of the sealing member on the valve body during mounting the sealing member on the valve body, the position-limiting rib is provided in the valve body, the gap is formed between the side wall and the position-limiting rib, and the first portion of the sealing member is arranged in the gap between the side wall and the position-limiting rib during the assembly of the sealing member and the valve body, so that the position-limiting rib can limit the assembly position of the sealing member on the valve body. By providing the position-limiting rib with the arc section in the embodiments of the present disclosure, the arc length of the sealing member can be limited by the position-limiting rib, which can reduce the local deformation of the sealing member during assembly, thereby improving the sealing performance of the control valve and improving the stability and quality of the control valve.

DETAILED DESCRIPTION OF THE EMBODIMENTS

Figure 1:
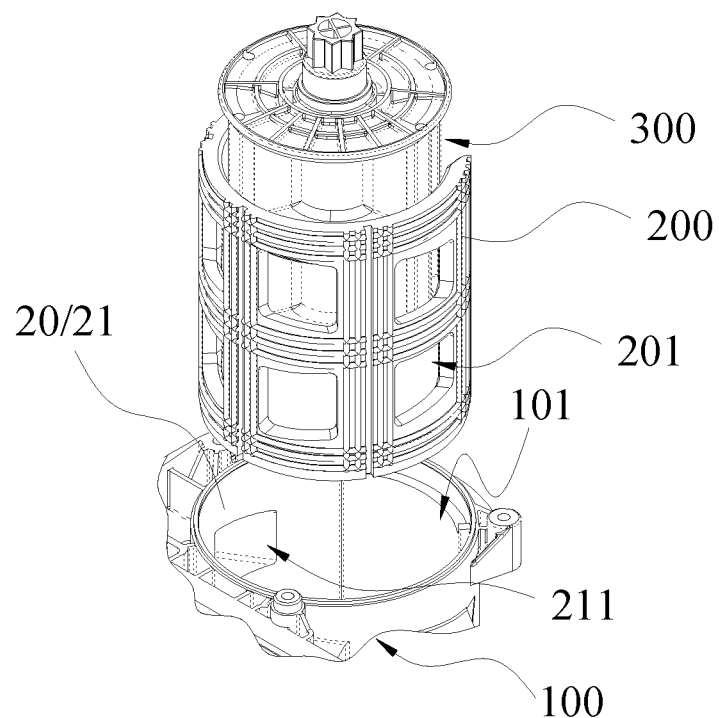
FIG. 1 is a partially schematic exploded view of a control valve according to an embodiment of the present disclosure.

The features and exemplary embodiments of various aspects of the present application are described in detail below. To make the objects, solutions and advantages of the present application clear and apparent, the present application is described in detail in conjunction with the drawings and the specific embodiments.

In the field of control valves for fluid control, a control valve includes a valve body, a valve core assembly and a sealing member located between the valve body and the valve core assembly, the valve body has a mounting cavity, at least part of the valve core assembly is located in the mounting cavity, the valve core assembly is driven to rotate by a driving device, and the sealing member is configured to seal a gap between the valve core assembly and the valve body, so as to prevent the valve core assembly from leaking during operation.

Generally, the valve body and the sealing member are arranged separately, that is, the sealing member and the valve body are two separate members, then the separate sealing member and the separate valve body are manually assembled together, and then the sealing member is extruded after the valve core assembly 300 is assembled into a mounting space formed by the sealing member, so that a sealing condition among the valve body, the sealing member and the valve core assembly is formed. In order to facilitate the assembly of the sealing member into the mounting cavity of the valve body, a position-limiting member may be provided in the valve body, so as to mount the sealing member between the position-limiting member and the side wall of the valve body. A structure of the position-limiting member is an important factor, which may cause a part of the sealing member not to be limited by the position-limiting member, and may easily cause the deformation of the sealing member, such as the curling of the sealing member, during the assembly of the sealing member and the valve body or during the assembly of the valve core assembly and the sealing member, thereby effecting the sealing performance of the control valve.

A control valve 1000 is provided according to an embodiment of the present disclosure. The control valve 1000 according to the embodiment of the present disclosure is described below with reference to the accompanying drawings.

Referring to FIGS. 1 to 4, the control valve 1000 according to the embodiment of the present disclosure includes a valve body 100, a valve core assembly 300 and a sealing member 200. The valve body 100 has a mounting cavity 101, at least part of the valve core assembly 300 is located in the mounting cavity 101, the valve core assembly 300 is rotatable, for example, the valve core assembly is driven to be rotatable by an external driving member, so as to control the fluid. The valve body 100 includes a side wall 20, the sealing member 200 is located in the mounting cavity 101 and is arranged between the side wall 20 of the valve body 100 and the valve core assembly 300, so as to seal a gap between the side wall 20 of the valve body 100 and the valve core assembly 300, thereby improving the quality and stability of the control valve 1000. It can be understood that the side wall 20 is a side wall which defines the mounting cavity 101, and the side wall 20 includes an inner contour and an outer contour, and shapes of the inner contour and the outer contour may be the same or different. For example, in FIG. 1, the inner contour of the side wall 20 is in a cylindrical surface, and the outer contour of the side wall includes a mounting flat surface, so as to facilitate of fitting the control valve 1000.

In order to facilitate the assembly of the sealing member and to better limit a position of the sealing member 200, in some embodiments, the valve body 100 includes a bottom wall 10, a side wall 20 and a position-limiting rib 30, and the side wall 20 protrudes from the bottom wall 10. In this embodiment, the position-limiting rib 30 includes an arc section, the position-limiting rib 30 is located in a space defined by the bottom wall 10 and the side wall 20 and protrudes from the bottom wall 10, a gap is formed between the side wall 20 and the position-limiting rib 30. The sealing member 200 after being assembled has an arc structure and the sealing member 200 is located in the gap. The assembled sealing member 200 has the arc structure, which refers to that an orthographic projection of the assembled sealing member 200 on the bottom wall 10 has an unclosed arc structure, that is, the assembled sealing member 200 has an inner surface and an outer surface, which are arc surfaces respectively. The sealing member 200 includes a first portion and a second portion. It defines that the first portion is close to an axial end of the sealing member 200 and the second portion is located between the valve core assembly 300 and the side wall 20. The first portion is fixedly connected to the second portion, and the first portion is located in the gap between the side wall 20 and the position-limiting rib 30.

In the valve body 100 according to the embodiment of the present disclosure, the position-limiting rib 30 is provided in the valve body 100, the gap is provided between the side wall 20 and the position-limiting rib 30, and the first portion of the sealing member 200 can be arranged in the gap between the side wall 20 and the position-limiting rib 30 during the assembly of the sealing member 200 and the valve body 100, so that the position-limiting rib 30 can limit a position of the sealing member 200 located in the gap. By providing the position-limiting rib 30 with the arc section in the embodiment of the present disclosure, an arc length of the sealing member 200 can be set by the position-limiting rib 300, which can reduce the local deformation of the sealing member 300 during assembly, thereby improving the sealing performance of the control valve and improving the stability and quality of the control valve. The valve body 100 according to the embodiment of the present disclosure can be manufactured or sold separately, and the sealing performance of the control valve 1000 can be improved by providing the valve body 100, which benefits the popularization and utilization.

Figure 4:
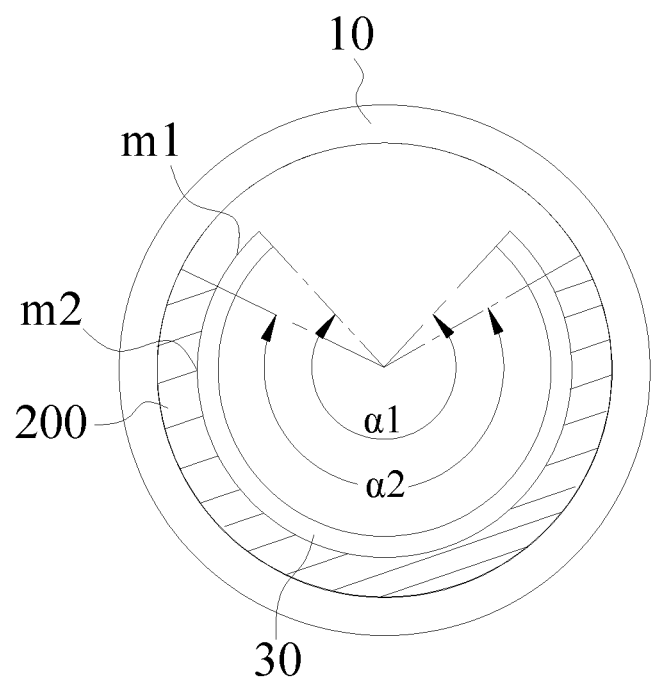
FIG. 4 is a schematic view showing an assembly of a position-limiting rib and a sealing member according to the embodiment of the present disclosure, and showing arc lengths and center angles of the position-limiting rib and the sealing member respectively.

In some embodiments, an arc length of the position-limiting rib 30 is greater than or equal to 0.9 times of an arc length of the first portion of the sealing member 200. It can be understood that, as shown in FIG. 4, the arc length m1 of the position-limiting rib 30 refers to an arc length, facing an arc surface of the sealing member 200, of the position-limiting rib 30, that is, an arc length of an outer surface of the position-limiting rib 30. The arc length m2 of the sealing member 200 refers to an arc length, facing an arc surface of the position-limiting rib 30, of the sealing member 200, that is, an arc length of an inner surface of the assembled sealing member 200. According to the embodiment of the present disclosure, by setting the arc length of the position-limiting rib 30 greater than or equal to 0.9 times of the arc length of the sealing member 200, most of the arc length of the sealing member 200 can be limited by the position-limiting rib 30 when the valve body 100 is applied to the control valve 1000, which is beneficial to reducing the deformation of the portion, not limited by the position-limiting rib 30, of the sealing member if the arc length of the position-limiting rib 30 is relative small during the assembly of the sealing member 200 or during the assembly of the sealing member 200 and the valve core assembly 300, thereby improving the sealing performance of the control valve 1000, and improving the stability and quality of the control valve 1000.

Figure 2:
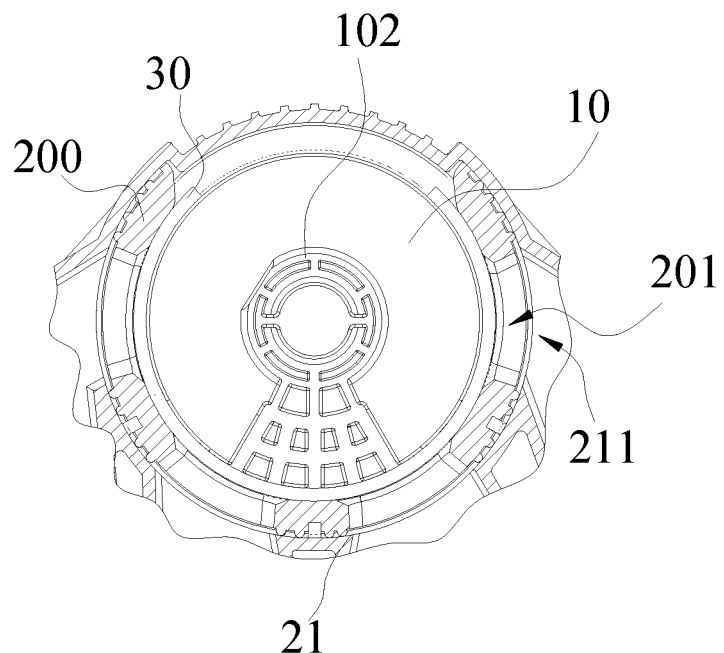
FIG. 2 is a partially schematic cross-sectional view of the control valve from a first perspective according to the embodiment of the present disclosure.
Figure 3:
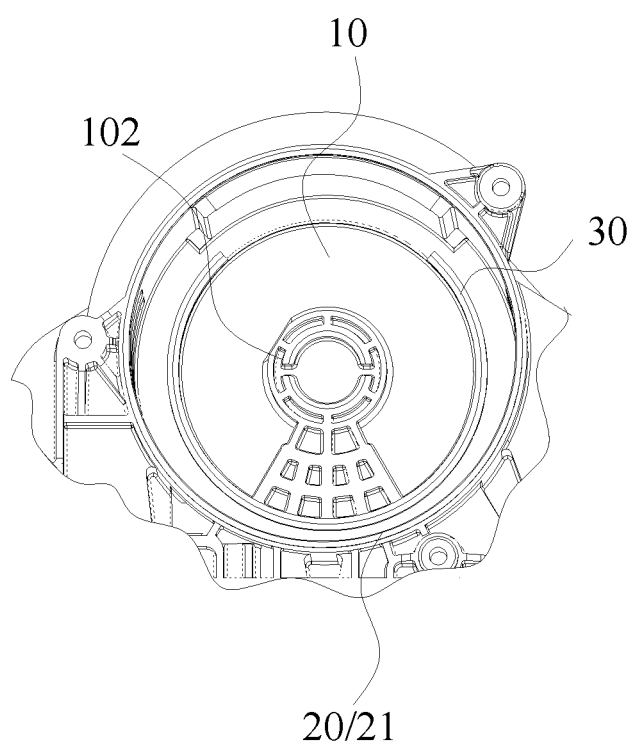
FIG. 3 is a partially schematic structural view of a valve body according to the embodiment of the present disclosure.

Referring to FIG. 2 and FIG. 3, since the sealing member 200 needs to ensure the static sealing between the sealing member 200 and the side wall 20 of the valve body 100 and the sealing member 200 further needs to ensure the dynamic sealing between the valve core assembly 300 and the sealing member 200 during the rotation of the valve core assembly 300, in some embodiments, the assembled sealing member 200 has an unclosed arc structure, and the unclosed arc structure can expand after it is subjected to a radial external force, so that the valve core assembly 300 and the sealing member 200 have a relatively large expansion space during the extrusion. Compared with the closed annular sealing member 200, the sealing member 200 according to the embodiment of the present disclosure can reduce the design difficulty and the processing difficulty. In case that the sealing member 200 has the unclosed arc structure, two circumferential sides of the sealing member 200 are easily deformed during the assembly, so that edges of the two circumferential sides of the sealing member 200 can be prevented from deforming by setting the arc length of the position-limiting rib 30.

In order to better limit the position of the sealing member 200 and avoid the deformation of the sealing member 200 during the assembly of the control valve 1000, in some embodiments, a center angle corresponding to an arc length of the position-limiting rib 30 is equal to 0.7-1 time of a center angle corresponding to an arc length of the inner surface of the side wall 20. Since the inner surface of the side wall 20 is a closed cylindrical curved surface, the center angle corresponding to the arc length of the arc side wall 20 is 360 degrees. By arranging the center angle corresponding to the arc length of the position-limiting rib 30 equal to 0.7-1 time of the center angle corresponding to the arc length of the inner surface of the side wall 20, it is calculated that the center angle corresponding to the arc length of the position-limiting rib 30 ranges from 252 degrees to 360 degrees, and the arc length of the position-limiting rib 30 can be calculated by the formula m=n×π×r/180. In the formula, m represents the arc length of the position-limiting rib 30, n represents the degrees of the center angle corresponding to the arc length of the position-limiting rib 30, r represents the radius corresponding to the arc length of the position-limiting rib 30, and in that case, more larger portion of the sealing member 200 can be limited by the position-limiting rib 30.

Referring to FIG. 4, in some embodiment, a center angle α2 corresponding to an arc length of the first portion of the sealing member 200 is greater than or equal to 270 degrees and is less than or equal to 280 degrees. Optionally, the center angle corresponding to the arc length of the first portion of the sealing member 200 may be 276 degrees. A center angle α1 corresponding to the arc length of the position-limiting rib 30 is greater than or equal to 260 degrees and is less than or equal to 360 degrees. In practice, in case that the center angle corresponding to the arc length of the position-limiting rib 30 is 260 degrees, and the center angle corresponding to the arc length of the sealing member 200 is 276 degrees, the arc length of the position-limiting rib 30 is equal to 0.9 times of the arc length of the sealing member 200; in case that the center angle corresponding to the arc length of the position-limiting rib 30 is 360 degrees and the center angle corresponding to the arc length of the sealing member 200 is 276 degrees, the arc length of the position-limiting rib 30 is equal to 4.2 times of the arc length of the sealing member 200. With the above arrangement, the sealing member 200 can have a relatively large expansion space, the position-limiting rib 30 can limit most portion of the sealing member 200, and the deformation of the sealing member 200 during assembly can be effectively reduced by setting the arc length of the position-limiting rib 30. It can be understood that the center angle corresponding to the arc length of the sealing member 200 can be set according to the needs of the user. For example, the center angle corresponding to the arc length of the sealing member 200 may be 260 degrees or in other degrees, and the center angle corresponding to the arc length of the position-limiting rib 30 is accordingly adjusted according to the arc length of the sealing member 200.

In order to facilitate the arrangement and manufacturing of the sealing member 200, in some embodiments, the center angle corresponding to the arc length of the position-limiting rib 30 is equal to the center angle corresponding to the arc length of the first portion of the sealing member 200. With the above arrangement, the position-limiting rib 30 can completely limit the sealing member 200 and prevent the deformation thereof. It can be understood that the position-limiting rib 30 and the sealing member 200 are sleeved with each other and the position-limiting rib 30 is arranged corresponding to the sealing member 200, so that the position-limiting rib 30 can achieve a better position-limiting effect.

Figure 5:
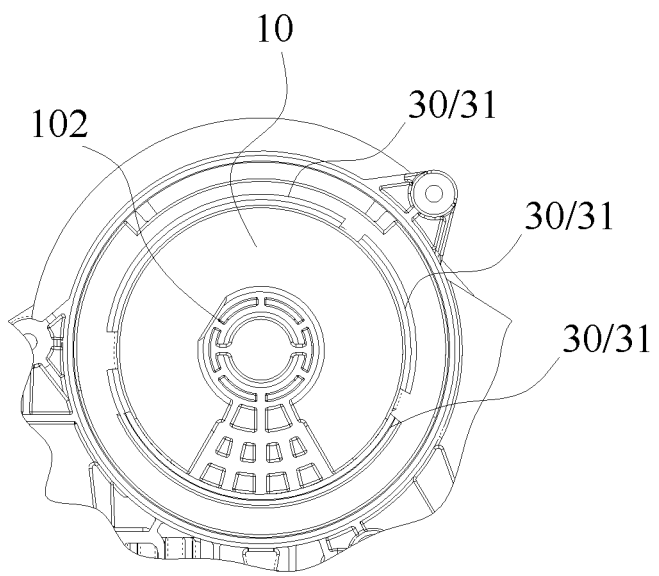
FIG. 5 is a top view showing a partial structure of the valve body according to another embodiment of the present disclosure.
Figure 6:
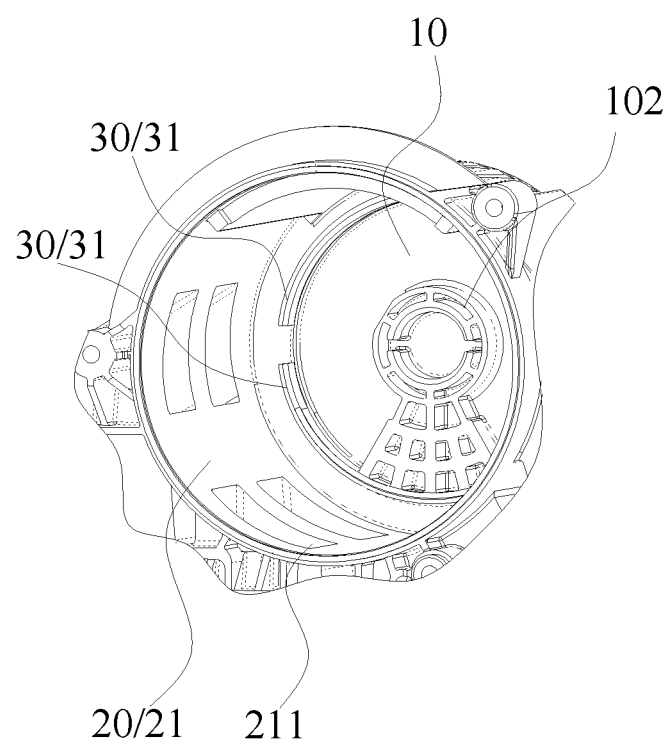
FIG. 6 is a schematic perspective view showing the partial structure of the valve body in FIG. 5.
Figure 7:
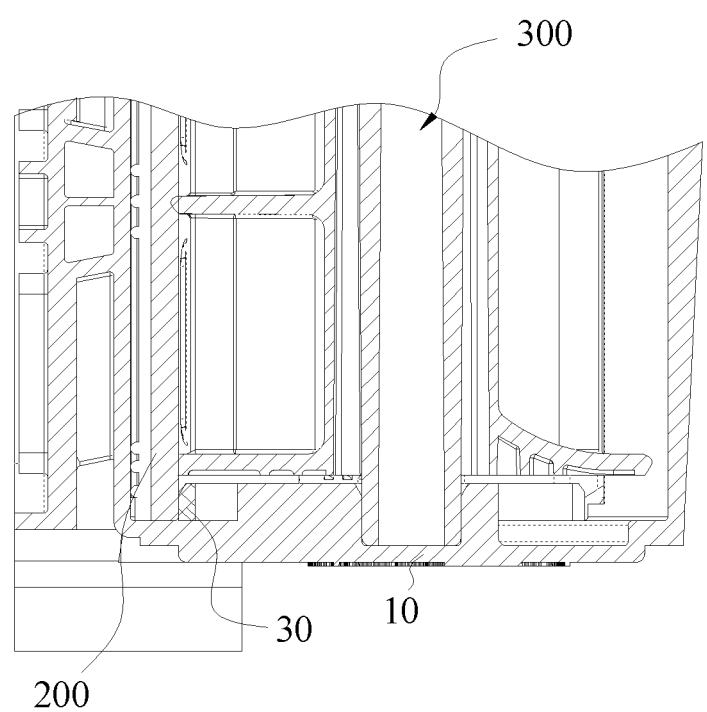
FIG. 7 is a partially schematic cross-sectional view of the control valve from a second perspective according to the embodiment of the present disclosure.

Referring to FIGS. 5 to 7, in order to improve the position-limiting performance of the position-limiting rib 30 to the sealing member 200 and effectively avoid the deformation of the sealing member 200, in some embodiments, the position-limiting rib 30 includes at least two position-limiting blocks 31, each of which has an arc structure, and the at least two position-limiting blocks 31 are spaced apart along a circumferential direction of the mounting cavity 101. The arc length of the position-limiting rib 30 is greater than a sum of arc lengths of the at least two position-limiting blocks 31. Since the at least two position-limiting blocks 31 are spaced apart, a spaced passage is formed between two adjacent position-limiting blocks 31, and the arc length of the position-limiting rib 30 is equal to the sum of the arc lengths of the at least two position-limiting blocks 31 and an arc length corresponding to the spaced passage between the two position-limiting blocks 31, that is, the arc length of the position-limiting rib 30 is a maximum arc length passing through a center of the position-limiting rib 30 and end points of the two position-limiting blocks 31 arranged at the edge in the circumferential direction. The sealing member 200 can be limited at each circumferential position of the sealing member 200 by providing at least two position-limiting blocks 31 that are spaced apart. For example, three position-limiting blocks 31 are provided, two of the position-limiting blocks 31 are respectively arranged at edges on two sides of the sealing member 200, and the other one of the position-limiting blocks 31 is located in the middle of the sealing member 200 in the circumferential direction, so as to prevent the sealing member 200 from deforming, thereby improving the sealing performance of the control valve 1000. It can be understood that the number of the at least two position-limiting blocks 31 are set according to the needs of the user. For example, the number of the position-limiting blocks 31 may be two, four or five, etc.

When the position-limiting rib 30 includes at least two position-limiting blocks 31, in some embodiments, the center angle corresponding to the arc length of each position-limiting block 31 is greater than or equal to 76 degrees, and a projection of each position-limiting block 31 at least partially overlaps with a projection of the first portion of the sealing member 200 in a radial direction of the side wall 20, so that each position-limiting block 31 can limit the position of the sealing member 200. Since the valve body 100 is a plastic member, which is formed generally by injection molding, the difficulty of the manufacturing can be simplified by arranging the center angle corresponding to the arc length of each position-limiting block 31, so as to facilitate the manufacture and molding of the arc position-limiting blocks 31. In practice, the interval between the position-limiting blocks 31 can be set according to the needs of the user, as long as each position-limiting block 31 can limit the first portion of the sealing member 200.

In some embodiments, a width of the gap between the position-limiting rib 30 and the side wall 20 is greater than or equal to a thickness of the first portion of the sealing member 200, and the sealing member 200 is clamped between the valve core assembly 300 and the side wall 20. The above arrangement can facilitate the assembly of the sealing member 200 and the valve body 100.

Since the valve core assembly 300 needs to be sleeved on a side of the inner surface of the side wall 20, in order to enable the valve core assembly 300 to be coaxial with the side wall 20 and thus enable the valve core assembly 300 rotate stably, in some embodiments, the position-limiting rib 30 is coaxial with the side wall 20, the position-limiting rib 30 has a position-limiting surface which faces the side wall 20, and a shape of the position-limiting surface is matched with a shape of the sealing member 200, so that the sealing member 200 is coaxial with the side wall 20. In case that the position-limiting rib 30 includes at least two position-limiting blocks 31, arc surfaces, away from the surface of the side wall 20, of the at least two position-limiting blocks 41 are coplanar with each other, so as to better limit the position of the sealing member 200.

In order to facilitate the assembly of the valve core assembly 300 and the valve body 100, in some embodiments, the valve body 100 includes a mounting portion 102, which is located in the mounting cavity 101 and protrudes from the bottom wall 10, part of the valve core assembly 300 is inserted into the mounting portion 102, and a height of the position-limiting rib 30 protruding from the bottom wall 10 is less than or equal to a height of the mounting portion 102 protruding from the bottom wall 10. The above arrangement enables the position-limiting rib 30 to limit the position of the sealing member 30 and prevent the excessive height of the position-limiting rib 30 from affecting the assembly of the valve core assembly 300. In practice, the height of the position-limiting rib 30 can be set according to the needs of the user. In order to avoid affecting the position-limiting performance if the height of the position-limiting rib 30 is small, optionally, the height of the position-limiting rib 30 may be configured to be slightly less than the height of the mounting portion 102, as long as the assembly and rotation of the valve core assembly 300 are not affected.

The control valve 1000 according to the embodiments of the present disclosure is configured to control the fluid. The control valve 1000 is used in a heat exchange system, such as a vehicle air conditioning system or a household air conditioning system. Specifically, a working medium flowing through the control valve 1000 may be water, a mixture of water and other liquids, or other coolants with thermal conductivity. The control valve 1000 controls the distribution of the working medium and adjusts the outlet flow rate flowing through the control valve 1000 so as to control the working medium of the flow path of the heat exchange system, which can improve the control performance of the flow path of the heat exchange system.

In order to realize the control performance of the control valve 1000 on the fluid, in some embodiments, the side wall 20 includes a first sub-portion 21 which extends along a circumferential direction of the side wall 20. The first sub-portion 21 includes a first communication port 211, which extends through the first sub-portion 21. The sealing member 200 includes a second communication port 201, which extends through the sealing member 200. The second communication port 201 corresponds to and is in communication with the first communication port 211, and the position-limiting rib 30 is arranged close to the first sub-portion 21 along the circumferential direction of the side wall 20. With the above arrangement, the position-limiting rib 30 can better limit the sealing member 200 sleeved on the side of the inner surface of the first sub-portion 21 so as to prevent the sealing member 200 from deforming.

To sum up, in the control valve 1000 according to the embodiments of the present disclosure, the control valve 1000 includes the valve body 100, the valve core assembly 300 and the sealing member 200, and the sealing member 200 is sleeved between the valve core assembly 300 and the side wall 20 of the valve body 100, so that the sealing member 200 can realize the sealing between the valve core assembly 300 and the valve body 100 and prevent the control valve 1000 from causing fluid leakage during operation. Since the sealing member 200 and the valve body 100 are two separate members, the position-limiting rib 30 is provided in the valve body 100 to limit the assembly position of the sealing member 200, so as to facilitate the assembly of the sealing member 200 and the valve body 100. The position-limiting rib 30 can limit more arc length of the sealing member 200 by setting the arc length of the position-limiting rib 30 greater than or equal to 0.9 times of the arc length of the sealing member 200 in the embodiment of the present disclosure, and thus, in case that the arc length of the position-limiting rib 30 is same, it is beneficial to reducing the deformation of the portion, which not limited by the position-limiting rib 30, of the sealing member 200 during the assembly of the sealing member 200 or during the assembly of the sealing member 200 and the valve core assembly 300, thereby improving the sealing performance of the control valve 1000, and improving the stability and quality of the control valve 1000, which is convenient for popularization and disclosure.

It should be understood that, relational terms such as "first" and "second" are merely used to distinguish one entity or operation from another entity or operation, but do not indicate or imply an actual relation or order of these entities or operations. It can be understood that the terms so used are interchangeable under appropriate circumstances such that the embodiments of the application described herein, for example, can function or be arranged in sequences other than those described herein or otherwise.

It should be noted that, the above embodiments are only intended to illustrate the present application and not to limit the technical solutions described in the present application. Although the present specification has been described in detail with reference to the embodiments described above, it should be understood by those skilled in the art that, various modifications and equivalents can be made to the technical solutions of the present application without departing from the spirit and scope of the present application, all of which should be contained within the scope of the claims of the present application.

The invention claimed is:

1. A control valve, comprising a valve body, a valve core assembly and a sealing member, wherein the valve body has a mounting cavity, at least part of the valve core assembly is located in the mounting cavity, wherein the valve body comprises a bottom wall, a side wall and a position-limiting rib, the side wall protrudes from the bottom wall, the position-limiting rib comprises an arc section, the position-limiting rib is located in a space defined by the side wall and the bottom wall and protrudes from the bottom wall, a gap is formed between the side wall and the position-limiting rib, wherein the sealing member comprises a first portion and a second portion, the first portion is close to an axial end of the sealing member, and the second portion is located between the valve core assembly and the side wall, wherein the first portion is fixedly connected to the second portion, and the first portion is located in the gap.

2. The control valve according to claim 1, wherein an arc length of the position- limiting rib is greater than or equal to 0.9 times of an arc length of the first portion of the sealing member.

3. The control valve according to claim 2, wherein a width of the gap between the position-limiting rib and the side wall is greater than or equal to a thickness of the first portion of the sealing member, and wherein the sealing member is clamped between the valve core assembly and the side wall.

4. The control valve according to claim 2, wherein the side wall comprises a first sub-portion which extends along a circumferential direction of the side wall, the first sub-portion comprises a first communication port, the first communication port extends through the first sub-portion, wherein the sealing member comprises a second communication port which extends through the sealing member, and the second communication port corresponds to and is in communication with the first communication port, and wherein the position-limiting rib is arranged close to the first sub-portion.

5. The control valve according to claim 1, wherein a center angle corresponding to an arc length of the position-limiting rib is equal to 0.7 times to 1 time of a center angle corresponding to an arc length of an inner surface of the side wall.

6. The control valve according to claim 5, wherein a width of the gap between the position-limiting rib and the side wall is greater than or equal to a thickness of the first portion of the sealing member, and wherein the sealing member is clamped between the valve core assembly and the side wall.

7. The control valve according to claim 5, wherein the side wall comprises a first sub-portion which extends along a circumferential direction of the side wall, the first sub-portion comprises a first communication port, the first communication port extends through the first sub-portion, wherein the sealing member comprises a second communication port which extends through the sealing member, and the second communication port corresponds to and is in communication with the first communication port, and wherein the position-limiting rib is arranged close to the first sub-portion.

8. The control valve according to claim 1, wherein a center angle corresponding to an arc length of the first portion of the sealing member is greater than or equal to 270 degrees and is less than or equal to 280 degrees, and a center angle corresponding to an arc length of the position-limiting rib is greater than or equal to 260 degrees and is less than or equal to 360 degrees.

9. The control valve according to claim 8, wherein the center angle corresponding to the arc length of the position-limiting rib is equal to the center angle corresponding to the arc length of the first portion of the sealing member.

10. The control valve according to claim 9, wherein a width of the gap between the position-limiting rib and the side wall is greater than or equal to a thickness of the first portion of the sealing member, and wherein the sealing member is clamped between the valve core assembly and the side wall.

11. The control valve according to claim 8, wherein a width of the gap between the position-limiting rib and the side wall is greater than or equal to a thickness of the first portion of the sealing member, and wherein the sealing member is clamped between the valve core assembly and the side wall.

12. The control valve according to claim 8, wherein the side wall comprises a first sub-portion which extends along a circumferential direction of the side wall, the first sub-portion comprises a first communication port, the first communication port extends through the first sub-portion, wherein the sealing member comprises a second communication port which extends through the sealing member, and the second communication port corresponds to and is in communication with the first communication port, and wherein the position-limiting rib is arranged close to the first sub-portion.

13. The control valve according to claim 1, wherein the position-limiting rib comprises at least two position-limiting blocks, and the at least two position-limiting blocks are spaced apart along a circumferential direction of the mounting cavity, and wherein an arc length of the position-limiting rib is greater than a sum of arc lengths of the at least two position-limiting blocks.

14. The control valve according to claim 13, wherein a center angle corresponding to the arc length of each position-limiting block is greater than or equal to 76 degrees, and a projection of each position-limiting block at least partially overlaps with a projection of the first portion of the sealing member along a radial direction of the side wall.

15. The control valve according to claim 1, wherein a width of the gap between the position-limiting rib and the side wall is greater than or equal to a thickness of the first portion of the sealing member, and wherein the sealing member is clamped between the valve core assembly and the side wall.

16. The control valve according to claim 15, wherein the position-limiting rib is coaxial with the side wall, the position-limiting rib has a position-limiting surface which faces the side wall, and a shape of the position-limiting is matched with a shape of the sealing member, so that the sealing member is coaxial with the side wall.

17. The control valve according to claim 15, wherein the valve body further comprises a mounting portion which is located in the mounting cavity and protrudes from the bottom wall, part of the valve core assembly is inserted into the mounting portion, and wherein a height of the position-limiting rib protruding from the bottom wall is less than or equal to a height of the mounting portion protruding from the bottom wall.

18. The control valve according to claim 14, wherein a width of the gap between the position-limiting rib and the side wall is greater than or equal to a thickness of the first portion of the sealing member, and wherein the sealing member is clamped between the valve core assembly and the side wall.

19. The control valve according to claim 1, wherein the side wall comprises a first sub-portion which extends along a circumferential direction of the side wall, the first sub-portion comprises a first communication port, the first communication port extends through the first sub-portion, wherein the sealing member comprises a second communication port which extends through the sealing member, and the second communication port corresponds to and is in communication with the first communication port, and wherein the position-limiting rib is arranged close to the first sub-portion.

20. The control valve according to claim 13, wherein a width of the gap between the position-limiting rib and the side wall is greater than or equal to a thickness of the first portion of the sealing member, and wherein the sealing member is clamped between the valve core assembly and the side wall.

* * * * *